(12) United States Patent
Mahajan et al.

(10) Patent No.: US 12,139,145 B2
(45) Date of Patent: Nov. 12, 2024

(54) MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventors: Aditya Mahajan, Wako (JP); Aya Miura, Wako (JP); Kenji Komori, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 296 days.

(21) Appl. No.: 17/691,151

(22) Filed: Mar. 10, 2022

(65) Prior Publication Data

US 2022/0297695 A1    Sep. 22, 2022

(30) Foreign Application Priority Data

Mar. 17, 2021    (JP) .................................. 2021-043098

(51) Int. Cl.
*B60W 30/18*    (2012.01)
*B60W 50/00*    (2006.01)
*B60W 60/00*    (2020.01)

(52) U.S. Cl.
CPC .. *B60W 30/18163* (2013.01); *B60W 50/0097* (2013.01); *B60W 60/00276* (2020.02);
(Continued)

(58) Field of Classification Search
CPC ....... B60W 30/18163; B60W 50/0097; B60W 60/00276; B60W 2420/403;
(Continued)

(56) References Cited

U.S. PATENT DOCUMENTS 8,825,265 B1 * 9/2014 Ferguson ............. G05D 1/0212
701/26
8,880,272 B1 * 11/2014 Ferguson ........ B60W 30/18163
701/26

(Continued)

FOREIGN PATENT DOCUMENTS

JP    2016-216021    12/2016
JP    2017-165197    9/2017
JP    2019-192233    10/2019

OTHER PUBLICATIONS

Japanese Office Action for Japanese Patent Application No. 2021-043098 mailed Aug. 6, 2024.

*Primary Examiner* — Dale W Hilgendorf
(74) *Attorney, Agent, or Firm* — Amin, Turocy & Watson, LLP

(57) ABSTRACT

A mobile object control device acquires an image obtained by imaging an outside space of a mobile object, determines whether the mobile object is in a merging lane closer to a merged lane between two merging lanes, determines whether another mobile object is in a merging lane farther from the merged lane between the merging lanes in front of the mobile object when it is determined that the mobile object is in the closer merging lane, sets one or more merging position candidates at which merging of the mobile object to the merged lane is completed and which are positions between mobile objects in the merged lane, and selects a merging position at which the merging of the mobile object to the merged lane is completed from the one or more merging position candidates.

8 Claims, 6 Drawing Sheets

(52) U.S. Cl.
CPC ... *B60W 2420/403* (2013.01); *B60W 2540/12* (2013.01); *B60W 2552/10* (2020.02); *B60W 2554/4041* (2020.02); *B60W 2710/20* (2013.01); *B60W 2720/106* (2013.01)

(58) Field of Classification Search
CPC ......... B60W 2540/12; B60W 2552/10; B60W 2554/4041; B60W 2710/20; B60W 2720/106
See application file for complete search history.

(56) References Cited

U.S. PATENT DOCUMENTS

| | | | |
|---|---|---|---|
| 10,293,819 B1* | 5/2019 | El-Khatib | B60W 60/00274 |
| 11,590,979 B2* | 2/2023 | Yoda | B60W 30/18163 |
| 2009/0060647 A1* | 3/2009 | Denison | E01C 1/02 404/1 |
| 2012/0283942 A1* | 11/2012 | T'Siobbel | G01C 21/26 701/410 |
| 2017/0120912 A1* | 5/2017 | Ishioka | B60W 30/16 |
| 2018/0074497 A1* | 3/2018 | Tsuji | G05D 1/0257 |
| 2020/0180641 A1* | 6/2020 | Hashimoto | B60W 30/18163 |
| 2020/0247412 A1* | 8/2020 | Wang | B60W 50/14 |
| 2021/0253107 A1* | 8/2021 | Takamatsu | B60W 30/18163 |
| 2021/0300373 A1* | 9/2021 | Yoda | B60W 30/18163 |
| 2024/0174227 A1* | 5/2024 | Nimura | B60W 30/143 |

* cited by examiner

MOBILE OBJECT CONTROL DEVICE, MOBILE OBJECT CONTROL METHOD, AND STORAGE MEDIUM

CROSS-REFERENCE TO RELATED APPLICATION

Priority is claimed on Japanese Patent Application No. 2021-043098, filed on Mar. 17, 2021, the content of which is incorporated herein by reference.

BACKGROUND

Field of the Invention

The present invention relates to a mobile object control device, a mobile object control method, and a storage medium.

Description of Related Art

Technologies for supporting entrance of vehicles traveling in merging lanes to merged lanes are known. Japanese Unexamined Patent Application, First Publication No. 2019-192233 discloses a technology for predicting behaviors of a plurality of vehicles based on a behavior prediction model at the time of merging to a merged lane and indicating a merging position based on the prediction.

SUMMARY

However, the technology disclosed in Japanese Unexamined Patent Application, First Publication No. 2019-192233 does not specifically consider a case in which there are two merging lanes. As a result, when the number of merging lanes are 2, a merging position cannot appropriately be indicated.

The present invention is devised in view of such circumstances and an objective of the present invention is to provide a mobile object control device, a mobile object control method, and a storage medium capable of appropriately indicating a merging position when the number of merging lanes is two.

A mobile object control device according to aspects of the present invention has the following configurations.

(1) According to an aspect of the present invention, a mobile object control device includes a storage device storing a program and a hardware processor. The hardware processor executes the program stored in the storage device to acquire an image obtained by imaging an outside space of a mobile object; to determine whether the mobile object is in a merging lane closer to a merged lane between two merging lanes, based on the image; to determine whether another mobile object is in a merging lane farther from the merged lane between the merging lanes in front of the mobile object when it is determined that the mobile object is in the closer merging lane; to set one or more merging position candidates at which merging of the mobile object to the merged lane is completed and which are positions between mobile objects in the merged lane; to select a merging position at which the merging of the mobile object to the merged lane is completed from the one or more merging position candidates; and to select the merging position from the merging position candidates excluding a merging position candidate located in front with respect to a traveling direction of the mobile object among the one or more merging position candidates when the hardware processor determines that there are other mobile objects.

(2) In the mobile object control device according to the aspect (1), the hardware processor may set a perpendicular drawn from the merging position candidate located in front with respect to the traveling direction of the mobile object on an assumed plane virtually seen from the above, compare a first distance between the mobile object and the virtual line with a second distance between the other mobile object and the virtual line, and determine that the other mobile object is in front of the mobile object when the second distance is shorter than the first distance.

(3) In the mobile object control device according to the aspect (1), the hardware processor may estimate a traveling trajectory of the other mobile object and determine whether the other mobile object is able to merge to the merging position candidate located in front based on the traveling trajectory. When the hardware processor determines that the other mobile object is not able to merge to the merging position candidate located in front, the hardware processor may select the merging position from the merging position candidates excluding a merging position candidate located in front and a merging position candidate located in a second place in the traveling direction of the mobile object among the one or more merging position candidates.

(4) In the mobile object control device according to the aspect (1), the hardware processor may estimate a time until an occupant of the mobile object manipulates a brake device of the mobile object. When the estimated time is less than a threshold, the hardware processor may select the merging position from the one or more merging position candidates without excluding the merging position candidate located in front with respect to the traveling direction of the mobile object.

(5) In the mobile object control device according to the aspect (1), the hardware processor may keep selecting the merging position even when the other mobile object is decelerated after the selection of the merging position from the merging position candidates excluding the merging position candidate located in front.

(6) In the mobile object control device according to the aspect (1), the hardware processor may generate a target trajectory of the mobile object merging to the selected merging position and control steering and acceleration or deceleration of the mobile object without depending on a manipulation of a driver of the mobile object such that the mobile object travels along the generated target trajectory.

(7) According to another aspect of the present invention, a mobile object control method causes a computer mounted in a vehicle: to acquire an image obtained by imaging an outside space of a mobile object; to determine whether the mobile object is in a merging lane closer to a merged lane between two merging lanes, based on the image; to determine whether another mobile object is in a merging lane farther from the merged lane between the merging lanes in front of the mobile object when it is determined that the mobile object is in the closer merging lane; to set one or more merging position candidates at which merging of the mobile object to the merged lane is completed and which are positions between mobile objects in the merged lane; to select a merging position at which the merging of the mobile object to the merged lane is completed from the one or more merging position candidates; and to select the merging position from the merging position candidates excluding a merging position candidate located in front with respect to a traveling direction of the mobile object among the one or more merging position candidates when the hardware processor determines that there are other mobile objects.

(8) According to still another aspect of the present invention, a computer-readable non-transitory storage medium stores a program causing a computer mounted in a mobile object: to acquire an image obtained by imaging an outside space of a mobile object; to determine whether the mobile object is in a merging lane closer to a merged lane between two merging lanes, based on the image; to determine whether another mobile object is in a merging lane farther from the merged lane between the merging lanes in front of the mobile object when it is determined that the mobile object is in the closer merging lane; to set one or more merging position candidates at which merging of the mobile object to the merged lane is completed and which are positions between mobile objects in the merged lane; to select a merging position at which the merging of the mobile object to the merged lane is completed from the one or more merging position candidates; and to select the merging position from the merging position candidates excluding a merging position candidate located in front with respect to a traveling direction of the mobile object among the one or more merging position candidates when the hardware processor determines that there are other mobile objects.

According to the aspects (1) to (8), it is possible to appropriately indicate a merging position when the number of merging lanes is 2.

DESCRIPTION OF EMBODIMENTS

Hereinafter, embodiments of a mobile object control method, and a storage medium according to the present invention will be described with reference to the drawings. A mobile object in the present invention is a four-wheeled vehicle, a two-wheeled vehicle, a micro-mobility, a robot, or the like. In the following description, a mobile object is assumed to be a four-wheeled vehicle.

Overall Configuration

Figure 1:
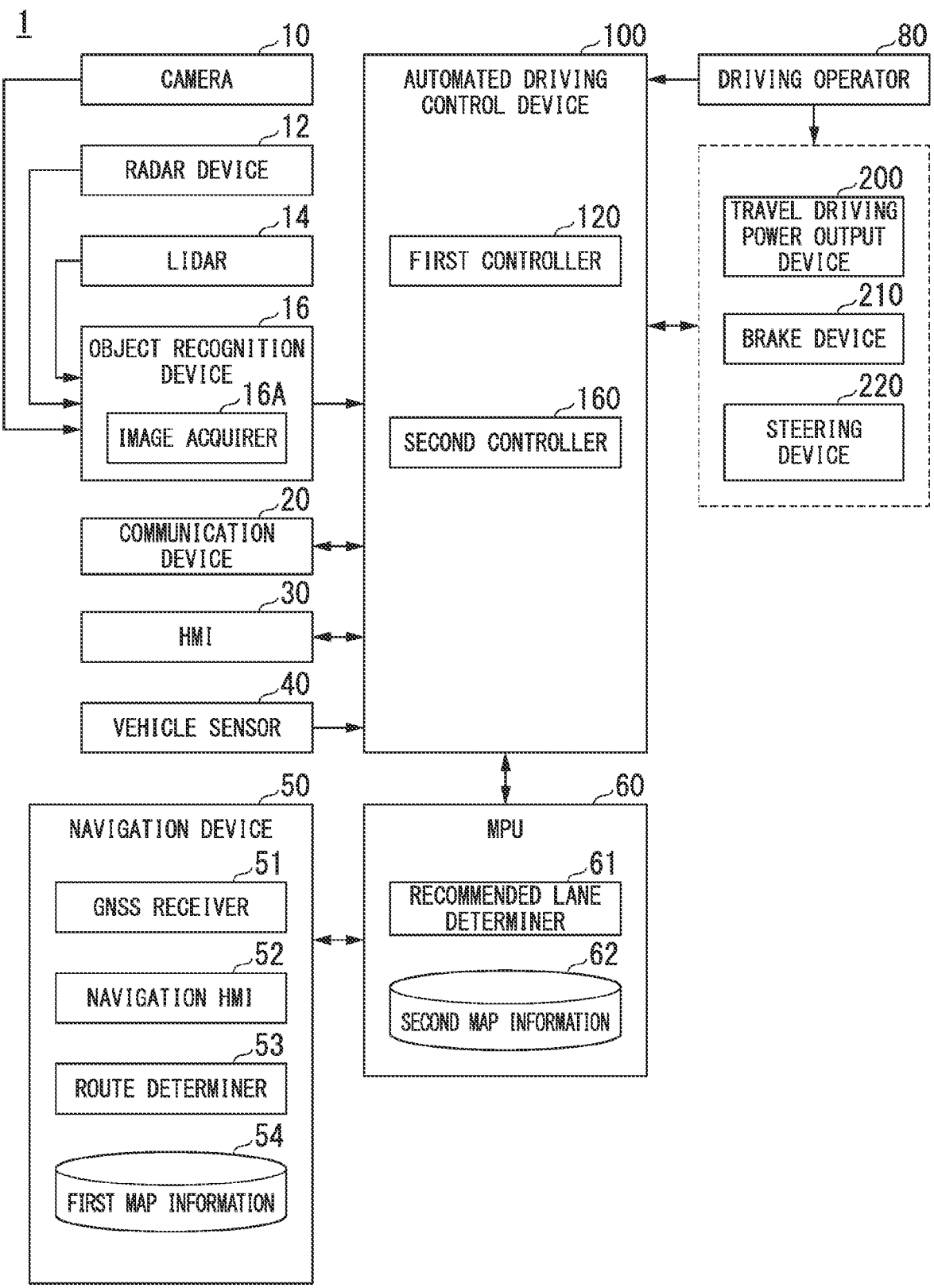
FIG. 1 is a diagram illustrating a configuration of a vehicle system in which a mobile object control device according to an embodiment is used.

FIG. 1 is a diagram illustrating a configuration of a vehicle system 1 in which a mobile object control device according to an embodiment is used. A vehicle in which the vehicle system 1 is mounted is, for example, a vehicle such as a two-wheeled vehicle or a four-wheeled vehicle and a driving source of the vehicle is an internal combustion engine such as a diesel engine or a gasoline engine, an electric motor, or a combination thereof. The electric motor operates using power generated by a power generator connected to the internal combustion engine or power discharged from a secondary cell or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving power output device 200, a brake device 210, and a steering device 220. The devices and units are connected to one another via a multiplex communication line such as a controller area network (CAN) communication line, a serial communication line, or a wireless communication network. The configuration shown in FIG. 1 is merely exemplary, a part of the configuration may be omitted, and another configuration may be further added.

The camera 10 is, for example, a digital camera that uses a solid-state image sensor such as a charged coupled device (CCD) or a complementary metal oxide semiconductor (CMOS). The camera 10 is mounted on any portion of a vehicle in which the vehicle system 1 is mounted (hereinafter referred to as the own vehicle M). When the camera 10 images a front side, the camera 10 is mounted on an upper portion of a front windshield, a rear surface of a rearview mirror, or the like. For example, the camera 10 repeatedly images the surroundings of the own vehicle M periodically. The camera 10 may be a stereo camera.

The radar device 12 radiates radio waves such as millimeter waves to the surroundings of the own vehicle M and detects radio waves (reflected waves) reflected from an object to detect at least a position (a distance and an azimuth of) of the object. The radar device 12 is mounted on any portion of the own vehicle M. The radar device 12 may detect a position and a speed of an object in conformity with a frequency modulated continuous wave (FM-CW) scheme.

The LIDAR 14 radiates light (or electromagnetic waves with a wavelength close to light) to the surroundings of the own vehicle M and measures scattered light. The LIDAR 14 detects a distance to a target based on a time from light emission to light reception. The radiated light is, for example, pulsed laser light. The LIDAR 14 or a plurality of LIDARs 14 are mounted on any portions of the own vehicle M.

The object recognition device 16 performs a sensor fusion process on detection results from some or all of the camera 10, the radar device 12, and the LIDAR 14 and recognizes a position, a type, a speed, and the like of an object. The object recognition device 16 outputs a recognition result to the automated driving control device 100. The object recognition device 16 may output detection results of the camera 10, the radar device 12, and the LIDAR 14 to the automated driving control device 100 without any change. In the embodiment, the object recognition device 16 includes an image acquirer 16A. The image acquirer 16A acquires an image of an outside space of a vehicle captured by the camera 10 and outputs the image to the automated driving control device 100 to be described below.

The communication device 20 communicates with another vehicle around the own vehicle M or various server devices via radio base stations using, for example, a cellular network, a Wi-Fi network, Bluetooth (registered trademark), dedicated short range communication (DSRC) or the like.

The HMI 30 presents various types of information to occupants of the own vehicle M and receives input operations by the occupants. The HMI 30 includes, for example, various display devices, speakers, buzzers, touch panels, switches, and keys.

The vehicle sensor 40 includes a vehicle speed sensor that detects a speed of the own vehicle M, an acceleration sensor that detects an acceleration, a yaw rate sensor that detects angular velocity around a vertical axis, and an azimuth sensor that detects an orientation of the own vehicle M.

The navigation device 50 includes, for example, a global navigation satellite system (GNSS) receiver 51, a navigation HMI 52, and a route determiner 53. The navigation device 50 retains first map information 54 in a storage device such as a hard disk drive (HDD) or a flash memory. The GNSS receiver 51 identifies a position of the own vehicle M based on signals received from GNSS satellites. The position of the own vehicle M may be identified or complemented by an inertial navigation system (INS) using an output of the vehicle sensor 40. The navigation HMI 52 includes a display device, a speaker, a touch panel, and a key. The navigation HMI 52 may be partially or entirely common to the above-described HMI 30. The route determiner 53 determines, for example, a route from a position of the own vehicle M identified by the GNSS receiver 51 (or any input position) to a destination input by the occupant using the navigation HMI 52 (hereinafter referred to as a route on a map) with reference to the first map information 54. The first map information 54 is, for example, information in which a road shape is expressed by links indicating roads and nodes connected by the links. The first map information 54 may include curvatures of roads and point of interest (POI) information. The route on the map is output to the MPU 60. The navigation device 50 may perform route guidance using the navigation HMI 52 based on the route on the map. The navigation device 50 may be implemented by, for example, a function of a terminal device such as a smartphone or a tablet terminal possessed by the occupant. The navigation device 50 may transmit a present position and a destination to a navigation server via the communication device 20 to acquire the same route as the route on the map from the navigation server.

The MPU 60 retains, for example, second map information 62 in a storage device such as an HDD or a flash memory in addition to a recommended lane determiner 61. The recommended lane determiner 61 divides a route on a map provided from the navigation device 50 into a plurality of blocks (for example, divides the route in a vehicle movement direction for each 100 [m]) and determines a recommended lane for each block with reference to the second map information 62. The recommended lane determiner 61 determines in which lane the vehicle travels from the left. When there is a branching location in the route on the map, the recommended lane determiner 61 determines a recommended lane so that the own vehicle M can travel in a reasonable route to move to a branching destination.

The second map information 62 is map information that has higher accuracy than the first map information 54. The second map information 62 includes, for example, information regarding the middles of lanes or information regarding boundaries of lanes. The second map information 62 may include road information, traffic regulation information, address information (address and postal number), facility information, and telephone number information. The second map information 62 may be updated frequently by causing the communication device 20 to communicate with another device.

The driving operator 80 includes, for example, an accelerator pedal, a brake pedal, a shift lever, a steering wheel, a heteromorphic steering wheel, a joystick, and other operators. A sensor that detects an operation amount or presence or absence of an operation is mounted on the driving operator 80. The detection result is output to the automated driving control device 100 or some or all of the travel driving power output device 200, the brake device 210, and the steering device 220.

The automated driving control device 100 includes, for example, a first controller 120 and a second controller 160. Each of the first controller 120 and the second controller 160 is implemented, for example, by causing a hardware processor such as a central processing unit (CPU) to execute a program (software). Some or all of the constituent elements may be implemented by hardware (a circuit unit including circuitry) such as a large scale integration (LSI), an application specific integrated circuit (ASIC), a field-programmable gate array (FPGA), or a graphics processing unit (GPU) or may be implemented by software and hardware in cooperation. The program may be stored in advance in a storage device (a storage device including a non-transitory storage medium) such as an HDD or a flash memory of the automated driving control device 100 or may be stored in a storage medium such as a DVD or a CD-ROM which can be detachably mounted, and a storage medium (a storage device including a non-transitory storage medium) may be mounted on a drive device to be installed in an HDD or a flash memory of the automated driving control device 100. A combination of the object recognition device 16 and the automated driving control device 100 is an example of a "mobile object control device." A combination of the first controller 120 and the second controller 160 is an example of a "driving controller."

Figure 2:
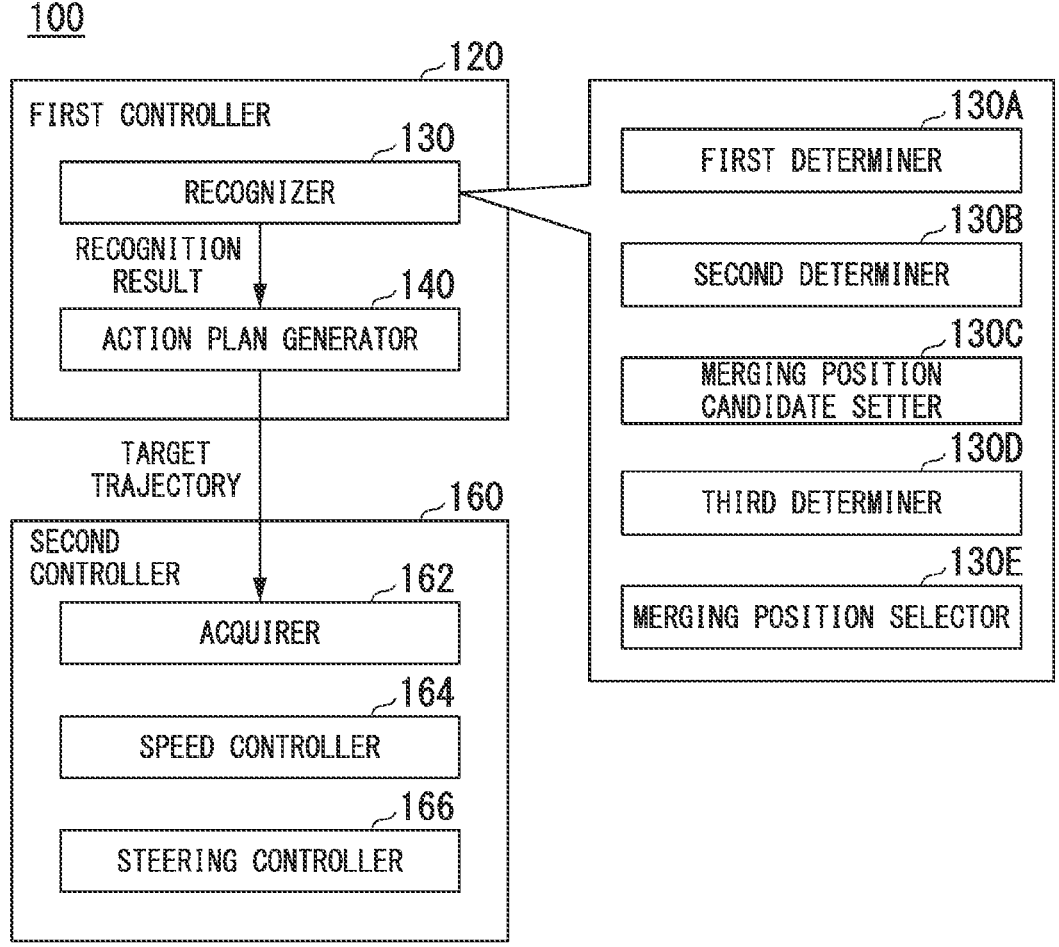
FIG. 2 is a diagram illustrating a functional configuration of first and second controllers.

FIG. 2 is a diagram illustrating a functional configuration of the first controller 120 and the second controller 160. The first controller 120 includes, for example, a recognizer 130 and an action plan generator 140. The first controller 120 implements, for example, a function by artificial intelligence (AI) and a function by a model given in advance concurrently. For example, a function of "recognizing an intersection" is realized by performing recognition of an intersection by deep learning or the like and recognition based on a condition given in advance (a signal, a road sign, or the like which can be subjected to pattern matching) concurrently, scoring both the recognitions, and performing evaluation comprehensively. Thus, reliability of the automated driving is guaranteed.

The recognizer 130 recognizes a position, a speed, an acceleration, and the like of an object which is around the own vehicle M based on information input from the camera 10, the radar device 12, and the LIDAR 14 via the object recognition device 16. For example, the position of the object is recognized as a position on the absolute coordinates in which a representative point (a center of gravity, a center of a driving shaft, or the like) of the own vehicle M is the origin and is used for control. The position of the object may be represented as a representative point such as a center of gravity, a corner, or the like of the object or may be represented as expressed regions. A "state" of an object may include both an acceleration and a jerk of the object or an "action state" (for example, whether a vehicle is changing a lane or is attempting to change the lane).

The recognizer 130 recognizes, for example, a lane in which the own vehicle M is traveling (a traveling lane). For example, the recognizer 130 recognizes the traveling lane by comparing patterns of road mark lines (for example, arrangement of continuous lines and broken lines) obtained from the second map information 62 with patterns of road mark lines around the own vehicle M recognized from images captured by the camera 10. The recognizer 130 may recognize an own lane by recognizing runway boundaries (road boundaries) including road mark lines or shoulders, curbstones, median strips, and guardrails without being limited to road mark lines. In this recognition, the position of the own vehicle M acquired from the navigation device 50 or a process result by INS may be added. The recognizer 130 recognizes temporary stop lines, obstacles, red signals, toll gates, signs, signboards, and other road events.

The recognizer 130 recognizes a position or posture of the own vehicle M with respect to a traveling lane when the recognizer 130 recognizes the traveling lane. For example, the recognizer 130 may recognize a deviation from the middle of a lane of the standard point of the own vehicle M and an angle formed with a line extending along the middle of a lane in the traveling direction of the own vehicle M as a relative position and posture of the own vehicle M with respect to the traveling lane. Instead of this, the recognizer 130 may recognize a position or the like of the standard point of the own vehicle M with respect to any side end portion (a road mark line or a road boundary) of the traveling lane as the relative position of the own vehicle M to the traveling lane.

In the embodiment, the recognizer 130 particularly includes a first determiner 130A, a second determiner 130B, a merging position candidate setter 130C, a third determiner 130D, and a merging position selector 130E. The functional details will be described below.

The action plan generator 140 generates a future target trajectory along which the own vehicle M travels automatedly (without depending on a manipulation by a driver) so that the own vehicle M travels in a recommended lane determined by the recommended lane determiner 61 in principle and deals with a surrounding situation of the own vehicle M. The target trajectory includes, for example, a position element. For example, the target trajectory is expressed by arranging points (trajectory points) in order at which the own vehicle M will arrive. The trajectory points are locations at which the own vehicle M will arrive for each predetermined traveling distance (for example, about several [m]) at a distance along a road. Apart from this, a target speed and a target acceleration for each a predetermined sampling time (for example, about every fractions of a second) are generated as part of the target trajectory. The trajectory points may be positions at which the own vehicle M will arrive at the sampling time for each predetermined sampling time. In this case, information regarding the target speed or the target acceleration is expressed at intervals of the trajectory points.

The action plan generator 140 may set an automated driving event when a target trajectory is generated. As automated driving events, there are a constant speed traveling event, a low speed following traveling event, a lane changing event, a branching event, a merging event, a takeover event, and the like. The action plan generator 140 generates a target trajectory in accordance with a started event.

The second controller 160 controls the travel driving power output device 200, the brake device 210, and the steering device 220 such that the own vehicle M passes along the target trajectory generated by the action plan generator 140 at a scheduled time.

Referring back to FIG. 2, the second controller 160 includes, for example, an acquirer 162, a speed controller 164, and a steering controller 166. The acquirer 162 acquires information regarding the target trajectory (trajectory points) generated by the action plan generator 140 and stores the information in a memory (not illustrated). The speed controller 164 controls the travel driving power output device 200 or the brake device 210 based on speed elements subsidiary to the target trajectory stored in the memory. The steering controller 166 controls the steering device 220 in accordance with a curved state of the target trajectory stored in the memory. Processes of the speed controller 164 and the steering controller 166 are implemented realized, for example, by combining feed-forward control and feedback control. For example, the steering controller 166 performs the feed-forward control in accordance with a curvature of a road in front of the own vehicle M and the feedback control based on deviation from the target trajectory in combination.

The travel driving power output device 200 outputs travel driving power (toque) for allowing a vehicle to travel to a driving wheel. The travel driving power output device 200 includes, for example, a combination of an internal combustion engine, an electric motor, and a transmission and a power electronic controller (ECU) controlling them. The power ECU controls the foregoing configuration in accordance with information input from the second controller 160 or information input from the driving operator 80.

The brake device 210 includes, for example, a brake caliper, a cylinder that transmits a hydraulic pressure to the brake caliper, an electronic motor that generates a hydraulic pressure to the cylinder, and a brake ECU. The brake ECU controls the electric motor in accordance with information input from the second controller 160 or information input from the driving operator 80 such that a brake torque in accordance with a brake manipulation is output to each wheel. The brake device 210 may include a mechanism that transmits a hydraulic pressure generated in response to a manipulation of the brake pedal included in the driving operator 80 to the cylinder via a master cylinder as a backup. The brake device 210 is not limited to the above-described configuration and may be an electronic control type hydraulic brake device that controls an actuator in accordance with information input from the second controller 160 such that a hydraulic pressure of the master cylinder is transmitted to the cylinder.

The steering device 220 includes, for example, a steering ECU and an electric motor. The electric motor works a force to, for example, a rack and pinion mechanism to change a direction of a steering wheel. The steering ECU drives the electric motor to change the direction of the steering wheel in accordance with information input from the second controller 160 or information input from the driving operator 80.

Operation

Figure 3:
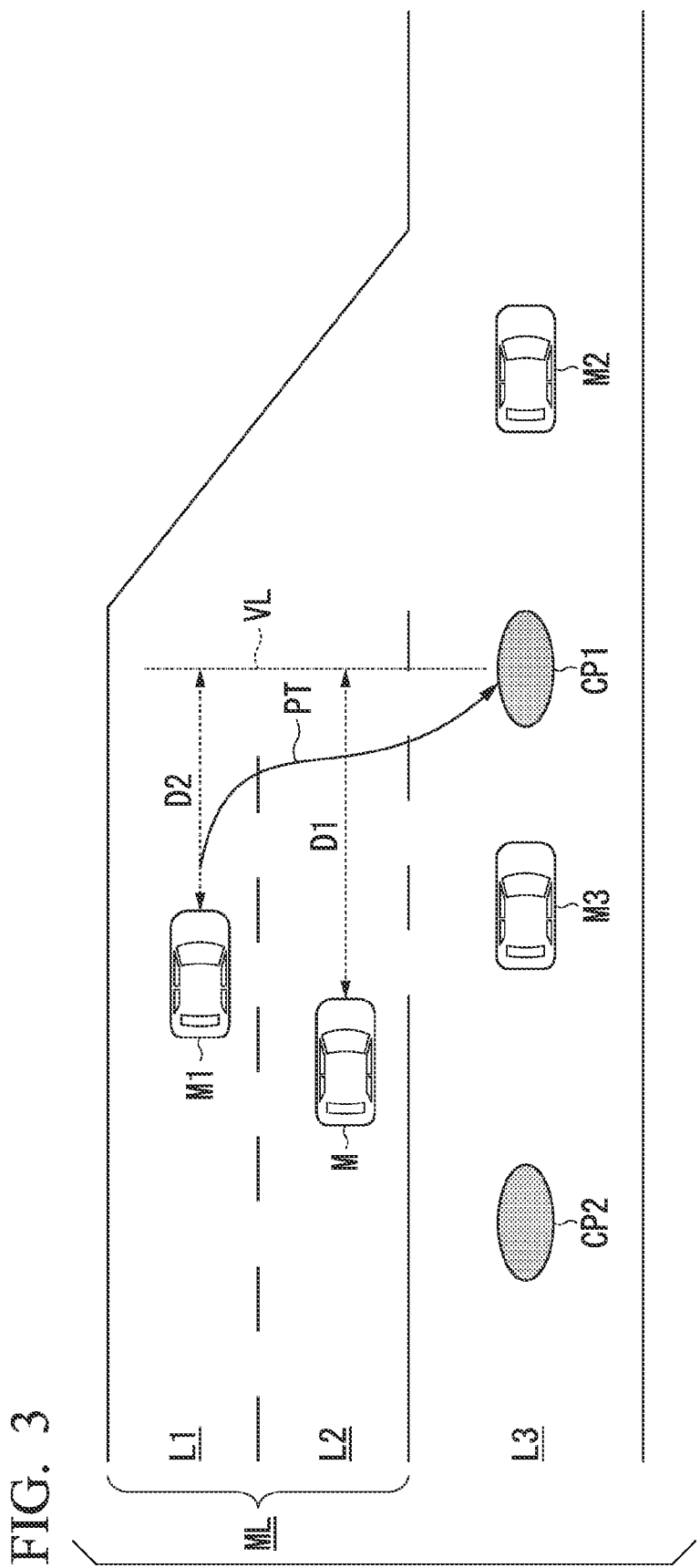
FIG. 3 is a diagram illustrating an example of a scenario in which a process of a mobile object control device according to an embodiment is performed.

Next, a process of the mobile object control device according to an embodiment will be described with reference to FIGS. 3 to 8. FIG. 3 is a diagram illustrating an example of a scenario in which a process of the mobile object control device according to the embodiment is performed. In FIG. 3, between merging lanes ML including two lanes L1 and L2, the own vehicle M is traveling in the merging lane L2 closer to a merged lane L3, and another vehicle M1 is traveling in the merging lane L1 farther from the merged lane L3. Further, other vehicles M2 and M3 are traveling in the merged lane L3. In order for the own vehicle M to enter the merged lane L3, the mobile object control device determines a merging position on the merged lane L3. On the other hand, since the other vehicle M1 attempts to enter the merged lane L3, it is necessary for the mobile object control device to determine a merging position on the merged lane L3 in consideration of entrance of the other vehicle M1 to the merged lane L3. The present invention is devised to determine a merging position in such a situation and utilize automated driving or driving support.

When an image of an outside space of the own vehicle M captured by the camera 10 is acquired from the image acquirer 16A, the first determiner 130A determines whether the own vehicle M is in a merging lane L2 (hereinafter a merging lane closer to the merged lane L3 is simply referred to as the "merging lane L2") closer to the merged lane L3 between the two merging lanes ML based on the image. Specifically, for example, when the second map information 62 indicates the merging lane L2 or the image of the outside space of the own vehicle M indicates the merging lane L2 or indicates a dashed-line shape specific to a junction road with two lanes, the first determiner 130A determines that the own vehicle M is in the merging lane L2. In the case of FIG. 3, the first determiner 130A determines that the own vehicle M is in the merging lane L2.

When the first determiner 130A determines that the own vehicle M is in the merging lane L2, the second determiner 130B determines whether another vehicle is in the merging lane L1 (hereinafter a merging lane farther from the merged lane L3 is simply referred to as the "merging lane L1") farther from the merged lane L3 of the merging lane ML in front of the own vehicle M. Specifically, for example, with the camera 10, the second determiner 130B determines whether another vehicle is in the merging lane L1 in front of the own vehicle M. Here, "in front of the own vehicle M" means that, for example, the front end of the other vehicle is ahead of the front end of the own vehicle M in a traveling direction of the own vehicle M. In the case of FIG. 3, since the front end of the other vehicle M1 is ahead of the front end of the own vehicle M and the other vehicle M1 is in the merging lane L1, the second determiner 130B determines that the other vehicle is in the merging lane L1 in front of the own vehicle M. Instead of this, "in front of the own vehicle M" may mean that the center of gravity of the other vehicle is ahead of the center of gravity of the own vehicle M or may mean that the front end of the other vehicle is ahead of the rear end of the own vehicle.

The merging position candidate setter 130C sets one or more merging position candidates CP at which merging of the own vehicle M to the merged lane L3 is completed and which are set as relative positions between vehicles in the merged lane L3. Specifically, for example, the merging position candidate setter 130C identifies a plurality of other vehicles in the merged lane L3 shown in an image captured by the camera 10 and determines whether the own vehicle M can enter the merged lane L3 on the premise that restrictions (an upper limit and a lower limit) of a speed, an acceleration, and a yaw rate are satisfied, based on relative distances and relative speeds of the plurality of other vehicles to the own vehicle M. When it is determined that the entrance is possible, merging position candidates CP are extracted as relative positions between the other vehicles located in front or to the rear of spaces in which the entrance is possible. In the case of FIG. 3, the merging position candidate setter 130C sets a position CP1 between the other vehicles M2 and M3 and a position CP2 to the rear of the other vehicle M3 as the merging position candidates CP.

The second determiner 130B can utilize the merging position candidates CP set by the merging position candidate setter 130C in order to determine whether other vehicles are in front of the own vehicle M. For example, in the case of FIG. 3, the second determiner 130B sets a perpendicular in the traveling direction of the own vehicle M drawn from the merging position candidate CP1 located in front with respect to the traveling direction of the own vehicle M as a virtual line VL on an assumed plane virtually seen from the above and compares a first distance D1 between the own vehicle M and the virtual line VL with a second distance D2 between the other vehicle M1 and the virtual line VL. When the second distance D2 is shorter than the first distance D1, it can be determined that the other vehicle M1 is in front of the own vehicle M.

The third determiner 130D estimates a traveling trajectory of the other vehicle and determines whether the other vehicle is able to merge to the merging position candidate CP1 located in front, based on the estimated traveling trajectory. Specifically, for example, the third determiner 130D estimates a speed vector or an acceleration vector of the other vehicle using the camera 10, the radar device 12, or the LIDAR 14 and generates a trajectory of the other vehicle with a straight line or a curved line based on the measurement information. In the case of FIG. 3, the third determiner 130D estimates a traveling trajectory PT of the other vehicle M1 merging to the merging position candidate CP1, and therefore determines that the other vehicle M1 can merge to the merging position candidate CP1.

The merging position selector 130E selects a merging position at which the merging of the own vehicle M to the merged lane L3 is completed from one or more merging position candidates CP set by the merging position candidate setter 130C. At this time, when the second determiner 130B determines that the other vehicle is in the merging lane L1 in front of the own vehicle M, the merging position selector 130E selects a merging position from the merging position candidates CP excluding the merging position candidate CP1 located in front with respect to the traveling direction of the own vehicle M among the one or more merging position candidates CP. In the case of FIG. 3, since the other vehicle M1 is traveling on the front left side of the own vehicle M, the merging position selector 130E selects a merging position from the merging position candidates CP excluding the merging position candidate CP1. That is, the merging position selector 130E selects the merging position candidate CP2 as the merging position.

On the other hand, even if the second determiner 130B determines that the other vehicle is in the merging lane L1 in front of the own vehicle M, the other vehicle does not reach the merging position candidate CP1 when the traveling trajectory to the merging position candidate CP1 located in front is not ended. In this case, when the merging position selector 130E selects the merging position candidate CP2 as the merging position, the other vehicle cannot change the lane to the merged lane L3.

Figure 4:
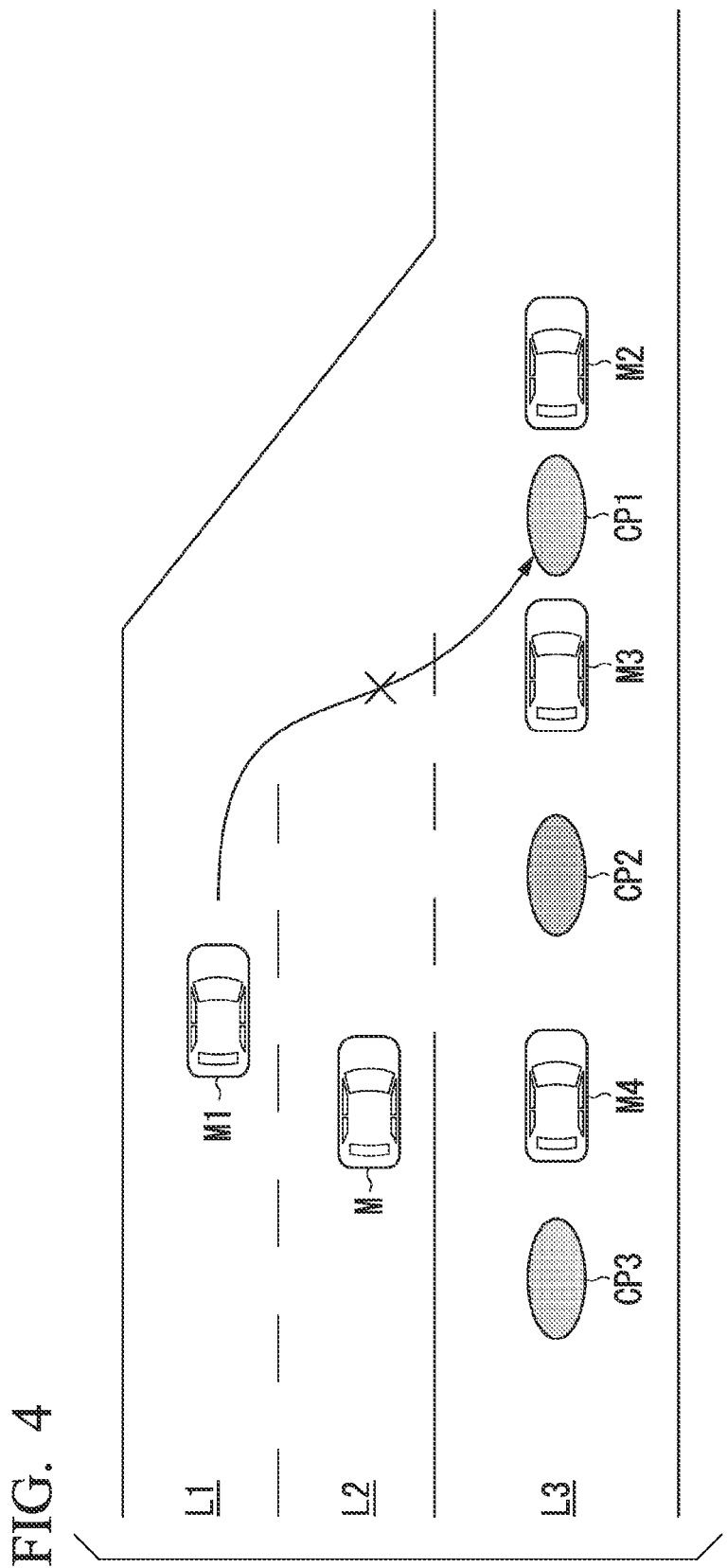
FIG. 4 is a diagram illustrating an example of a scenario in which a merging position selector selects a merging position when a third determiner determines that another vehicle cannot merge to a merging position candidate located in front.

Accordingly, when the third determiner 130D determines that the other vehicle cannot merge to the merging position candidate CP1 located in front, the merging position selector 130E selects a merging position from the merging position candidate CP excluding the merging position candidate CP1 located in front and the merging position candidate CP2 located in a second place in the traveling direction of the own vehicle M among the one or more merging position candidates CP. FIG. 4 is a diagram illustrating an example of a scenario in which the merging position selector 130E selects a merging position when the third determiner 130D determines that the other vehicle cannot merge to the merging position candidate CP1 located in front. In FIG. 4, other vehicles M2, M3, and M4 are traveling in the merged lane L3. In FIG. 4, the third determiner 130D determines that the traveling trajectory is not ended to the merging position candidate CP1 from the other vehicle M1. Therefore, the merging position selector 130E selects a merging position candidate CP3 as the merging position from the merging position candidates CP excluding the merging position candidate CP1 located in front and the merging position candidate CP2 located in the second place in the traveling direction of the own vehicle M among the merging position candidates CP. Thus, both the own vehicle M and the other vehicle M1 can perform lane change to the merged lane L3.

Figure 5:
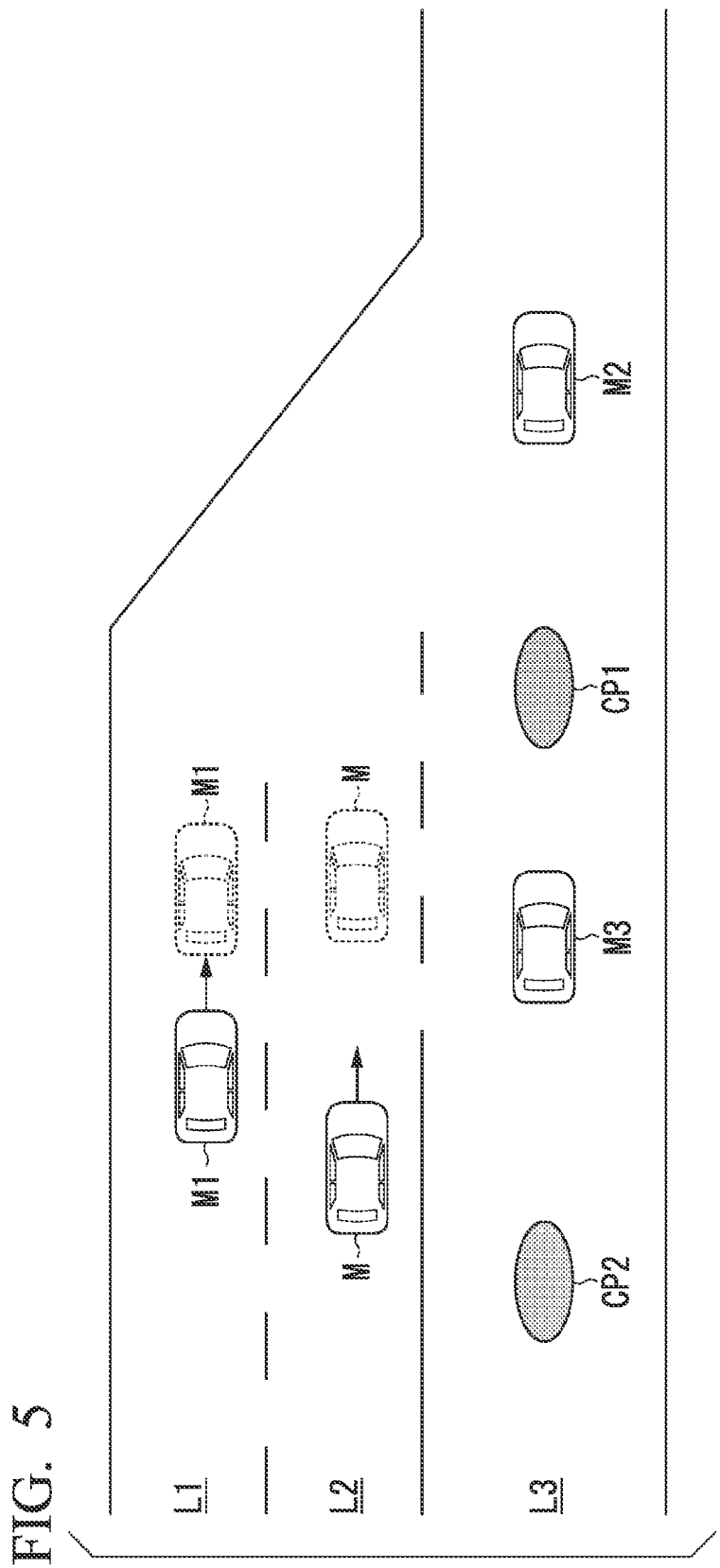
FIG. 5 is a diagram illustrating an example of a scenario in which an own vehicle is located in front of another vehicle as a deceleration result of the other vehicle after a merging position selector selects a merging position.

Even if the merging position selector 130E selects a merging position from the merging position candidates CP excluding the merging position candidate CP1 located in front, another vehicle is subsequently decelerated, and the own vehicle M is located in front of the other vehicle, the merging position selector 130E keeps this selection. FIG. 5 is a diagram illustrating an example of a scenario in which the own vehicle M is located in front of the other vehicle as a result of deceleration of the other vehicle after the merging position selector 130E selects a merging position. In FIG. 5, the merging position selector 130E selects the merging position candidate CP2 as a merging position. Subsequently, as a deceleration result of the other vehicle M1, the own vehicle M is located in front of the other vehicle M1. In this case, the merging position selector 130E keeps a selection result of the merging position candidate CP2 as the merging position. Thus, it is possible to prevent hunting of an operation of selecting the merging position and it is possible to stabilize a behavior of the own vehicle M.

Figure 6:
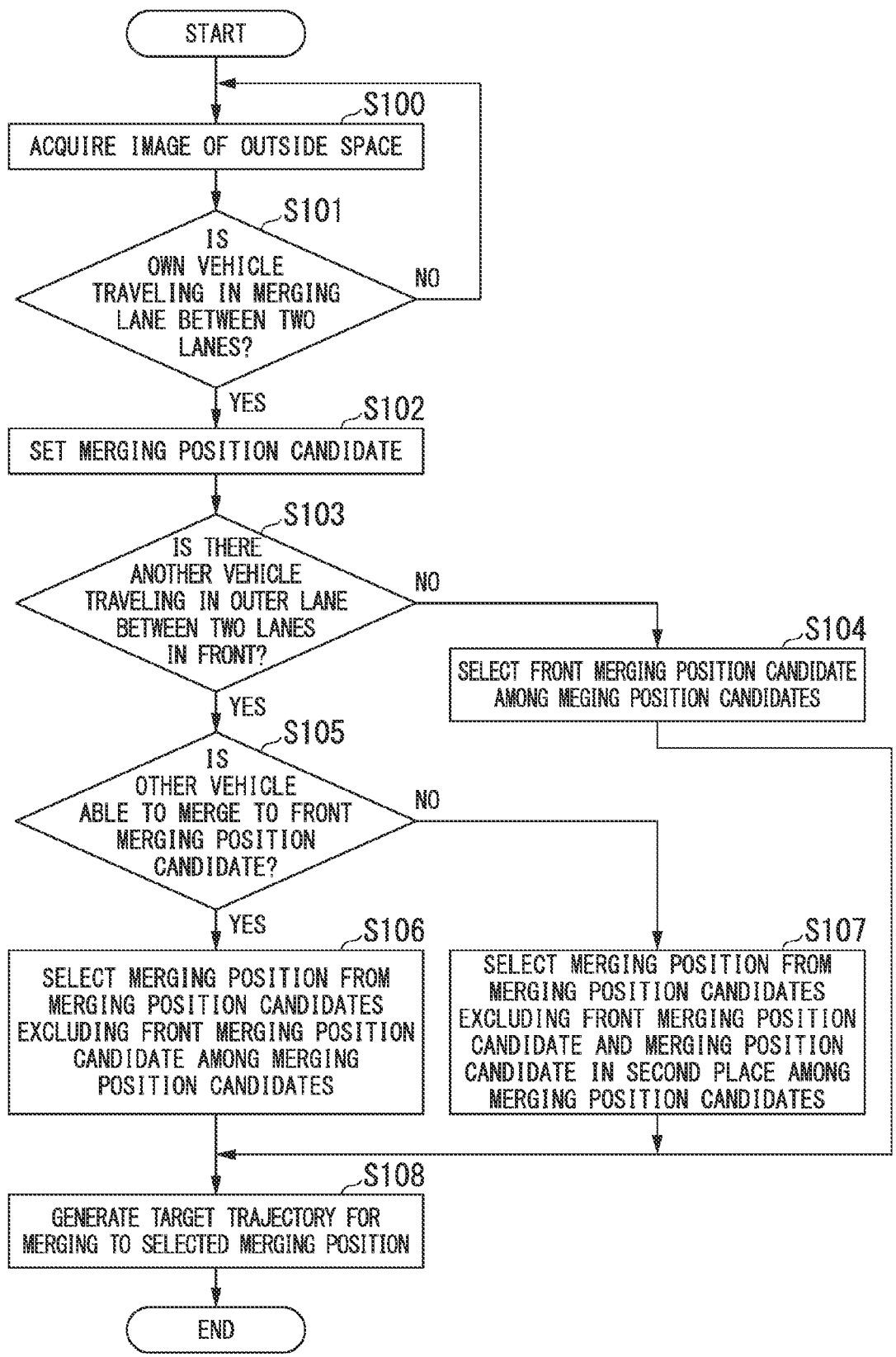
FIG. 6 is a flowchart illustrating an exemplary flow of a process of the mobile object control device according to the embodiment.

Next, an exemplary flow of the mobile object control device according to the embodiment will be described with reference to FIG. 6. FIG. 6 is a flowchart illustrating an exemplary flow of a process of the mobile object control device according to the embodiment. The mobile object control device performs the process of the flowchart at a predetermined control cycle (for example, 10 milliseconds).

First, the mobile object control device causes the image acquirer 16A to acquire an image obtained by imaging an outside space of the own vehicle M using the camera 10 (step S100). Subsequently, based on the image acquired from the image acquirer 16A, the mobile object control device causes the first determiner 130A to determine whether the own vehicle M is in the merging lane L2 closer to the merged lane L3 between the two merging lanes ML (step S101). When it is determined that the own vehicle M is not in the merging lane L2, the mobile object control device returns the process to step S100.

Conversely, when the own vehicle M is in the merging lane L2, the mobile object control device causes the merging position candidate setter 130C to set one or more merging position candidates CP at which merging of the own vehicle M to the merged lane L3 is completed (step S102). Subsequently, the mobile object control device causes the second determiner 130B to determine whether another vehicle is in the merging lane L1 farther from the merged lane L3 between the merging lanes ML in front of the own vehicle M (step S103). When it is determined that another vehicle is not in the merging lane L1 in front of the own vehicle M, the mobile object control device causes the merging position selector 130E to select the front merging position candidate CP1 as the merging position among one or more merging position candidates CP (step S104).

Conversely, when it is determined that another vehicle is in the merging lane L1 in front of the own vehicle, the mobile object control device causes the third determiner 130D to estimate a traveling trajectory of the other vehicle and determines whether the other vehicle is able to merge to the merging position candidate CP1 located in front, based on the estimated traveling trajectory (step S105). When it is determined that the other vehicle is able to merge to the merging position candidate CP1, the mobile object control device causes the merging position selector 130E to select a merging position from the merging position candidates excluding the front merging position candidate CP1 among the one or more merging position candidates CP (step S106).

Conversely, when it is determined that the other vehicle is not able to merge to the merging position candidate CP1, the mobile object control device causes the merging position selector 130E to select a merging position candidate as the merging position from the merging position candidates CP excluding the merging position candidate CP1 located in front and the merging position candidate CP2 located in the second place in the traveling direction of the own vehicle M among the one or more merging position candidates CP (step S107). Subsequently, the mobile object control device causes the action plan generator 140 to generate a target trajectory of the own vehicle M for merging to the selected merging position. Then, the process of the flowchart ends.

In the foregoing flowchart, the case in which the number of other vehicles in front of the own vehicle M is one has been described. However, the application of the present invention is not limited to such a situation. For example, when the number of other vehicles in front of the own vehicle M is plural, the merging position selector 130E may select a merging position in accordance with the number of other vehicles. Specifically, for example, in step S105, when a plurality of other vehicles are able to merge to the merging position candidate CP1, the merging position selector 130E may select a merging position form merging position candidates excluding the front merging position candidate CP1 to the same number of merging position candidates CP among the merging position candidates CP.

MODIFIED EXAMPLE

In the foregoing embodiment, the example in which the mobile object control device according to the present invention is applied to automated driving has been described. However, the mobile object control device according to the present invention is not limited to the configuration and can also be applied to manual driving. In this case, instead of the driving controller, the mobile object control device according to the embodiment may further include a driving instructor that generate a target trajectory based on a selected merging position and gives at least one of a steering instruction and an acceleration/deceleration instruction so that an occupant of the own vehicle M performs driving along the generated target trajectory. The driving instructor can be implemented as, for example, a part of the function of the navigation devices 50.

When the mobile object control device according to the present invention is applied to manual driving, the mobile object control device may further include a brake time estimator that estimates a time until an occupant of the own vehicle M manipulates the brake device 210, that is, a time to brake (TTB). In this case, when a time estimated by the brake time estimator is less than a threshold, the merging position selector 130E may determine that an occupant of the own vehicle M cannot afford to manipulate the brake device 210 and may select a merging position from all the merging position candidates CP without excluding the merging position candidate CP1 located in front with respect to the traveling direction of the own vehicle M. Thus, it is possible to select a merging position flexibly in accordance with a situation of the occupant of the own vehicle M.

According to the above-described present invention, the mobile object control device determines whether another vehicle traveling in front of the own vehicle in a merging lane farther from a merged lane when the number of merging lanes in which the own vehicle M travels is two. In accordance with a determination result, a merging position is selected. Thus, it is possible to appropriately indicate a merging position when the number of merging lanes is two.

The above-described embodiments can be expressed as follows.

A mobile object control device including:
a storage device storing a program; and
a hardware processor,
wherein the hardware processor executes the program stored in the storage device to:
acquire an image obtained by imaging an outside space of a mobile object;
determine whether the mobile object is in a merging lane closer to a merged lane between two merging lanes, based on the image;
determine whether another mobile object is in a merging lane farther from the merged lane between the merging lanes in front of the mobile object when it is determined that the mobile object is in the closer merging lane;
set one or more merging position candidates at which merging of the mobile object to the merged lane is completed and which are positions between mobile objects in the merged lane;
select a merging position at which the merging of the mobile object to the merged lane is completed from the one or more merging position candidates; and
select the merging position from the merging position candidates excluding a merging position candidate located in front with respect to a traveling direction of the mobile object among the one or more merging position candidates when the hardware processor determines that there are other mobile objects.

The embodiments for carrying out the present invention have been described above, but the present invention is not limited to the embodiments. Various modifications and substitutions can be made within the scope of the present invention without departing from the gist of the present invention.

What is claimed is:

1. A mobile object control device comprising:
a storage device storing a program; and
a hardware processor,
wherein the hardware processor executes the program stored in the storage device to:
acquire an image obtained by imaging an outside space of a mobile object;
determine whether the mobile object is in a merging lane closer to a merged lane, wherein the closer merging lane is between the merged lane and a merging lane farther from the merged lane, based on the image;
determine whether another mobile object is in the merging lane farther from the merged lane and is in front of the mobile object when it is determined that the mobile object is in the closer merging lane;
set one or more merging position candidates at which merging of the mobile object to the merged lane is completed and which are positions between mobile objects in the merged lane; and
select a merging position at which the merging of the mobile object to the merged lane is completed from the one or more merging position candidates;
wherein the hardware processor selects the merging position from the merging position candidates excluding a merging position candidate located in front with respect to a traveling direction of the mobile object among the one or more merging position candidates when it is determined that there are other mobile objects, and
wherein the hardware processor generates a target trajectory of the mobile object merging to the selected merging position and controls steering and acceleration or deceleration of the mobile object without depending on a manipulation of a driver of the mobile object such that the mobile object travels along the generated target trajectory.

2. The mobile object control device according to claim 1, wherein the hardware processor sets, as a virtual line, a perpendicular drawn from the merging position candidate located in front with respect to the traveling direction of the mobile object on an assumed plane virtually seen from above, compares a first distance between the mobile object and the virtual line with a second distance between the other mobile object and the virtual line, and determines that the other mobile object is in front of the mobile object when the second distance is shorter than the first distance.

3. The mobile object control device according to claim 1, wherein the hardware processor estimates a traveling trajectory of the other mobile object and determines whether the other mobile object is able to merge to the merging position candidate located in front based on the traveling trajectory, and
wherein, when the hardware processor determines that the other mobile object is not able to merge to the merging position candidate located in front, the hardware processor selects the merging position from the merging position candidates excluding the merging position candidate located in front and a merging position candidate located in a second place in the traveling direction of the mobile object among the one or more merging position candidates.

4. The mobile object control device according to claim 1, wherein the hardware processor estimates a time until an occupant of the mobile object manipulates a brake device of the mobile object, and
wherein, when the estimated time is less than a threshold, the hardware processor selects the merging position from the one or more merging position candidates without excluding the merging position candidate located in front with respect to the traveling direction of the mobile object.

5. The mobile object control device according to claim 1, wherein the hardware processor keeps selecting the merging position even when the other mobile object is decelerated after the selection of the merging position from the merging position candidates excluding the merging position candidate located in front.

6. A mobile object control method for causing a computer mounted in a vehicle to:
acquire an image obtained by imaging an outside space of a mobile object;
determine whether the mobile object is in a merging lane closer to a merged lane, wherein the closer merging lane is between the merged lane and a merging laner farther from the merged lane, based on the image;

determine whether another mobile object is in the merging lane farther from the merged lane and is in front of the mobile object when it is determined that the mobile object is in the closer merging lane;

set one or more merging position candidates at which merging of the mobile object to the merged lane is completed and which are positions between mobile objects in the merged lane;

select a merging position at which the merging of the mobile object to the merged lane is completed from the one or more merging position candidates; and select the merging position from the merging position candidates excluding a merging position candidate located in front with respect to a traveling direction of the mobile object among the one or more merging position candidates when the hardware processor determines that there are other mobile objects, and wherein the computer generates a target trajectory of the mobile object merging to the selected merging position and controls steering and acceleration or deceleration of the mobile object without depending on a manipulation of a driver of the mobile object such that the mobile object travels along the generated target trajectory.

7. A mobile object control device comprising:
a storage device storing a program; and
a hardware processor,
wherein the hardware processor executes the program stored in the storage device to:
acquire an image obtained by imaging an outside space of a mobile object;
determine whether the mobile object is in a merging lane closer to a merged lane based on the image, wherein the closer merging lane is between the merged lane and a merging lane farther from the merged lane;
determine whether another mobile object is in the merging lane farther from the merged lane and is in front of the mobile object when it is determined that the mobile object is in the closer merging lane;
set one or more merging position candidates at which merging of the mobile object to the merged lane is completed and which are positions between mobile objects in the merged lane; and
select a merging position at which the merging of the mobile object to the merged lane is completed from the one or more merging position candidates;

wherein the hardware processor selects the merging position from the merging position candidates excluding a merging position candidate located in front with respect to a traveling direction of the mobile object among the one or more merging position candidates when it is determined that there are other mobile objects, wherein the hardware processor generates a target trajectory of the mobile object merging to the selected merging position, and controls at least one of a steering and an acceleration/deceleration relating to the mobile object so as to assist an occupant of the mobile object in driving the mobile object along the generated target trajectory.

8. A method for driving assistance, comprising:

acquiring, by a system comprising a processor, an image obtained by imaging an outside space of a mobile object;

determining, by the system, whether the mobile object is in a merging lane closer to a merged lane based on the image, wherein the closer merging lane is between the merged lane and a merging lane farther from the merged lane;

based on the mobile object being in the closer merging lane, determining, by the system, whether another mobile object is in the merging lane farther from the merged lane and is in front of the mobile object;

setting, by the system, one or more merging position candidates at which merging of the mobile object to the merged lane is completed and which are positions between mobile objects in the merged lane; and selecting, by the system, a merging position at which the merging of the mobile object to the merged lane is completed from the one or more merging position candidates;

wherein the selecting the merging position from the merging position candidates comprise excluding a merging position candidate located in front with respect to a traveling direction of the mobile object among the one or more merging position candidates when it is determined that there are other mobile objects, and generating, by the system, a target trajectory of the mobile object merging to the selected merging position, and controlling, by the system, at least one of a steering and an acceleration/deceleration relating to the mobile object so as to assist an occupant of the mobile object in driving the mobile object along the generated target trajectory.

* * * * *